United States Patent
Dierke

Patent Number: 5,854,757
Date of Patent: Dec. 29, 1998

[54] SUPER-COMPACT HARDWARE ARCHITECTURE FOR IDCT COMPUTATION

[75] Inventor: Gregg Dierke, San Jose, Calif.

[73] Assignee: LSI Logic Corporation, Milpitas, Calif.

[21] Appl. No.: 643,953

[22] Filed: May 7, 1996

[51] Int. Cl.[6] ................................ G06F 17/14
[52] U.S. Cl. ..................... 364/725.03; 382/250
[58] Field of Search ............ 364/726.07, 725.03, 364/726.03, 725.01, 715.7, 759, 760.01, 760.02, 760.03, 760.04, 760.05, 748.09, 748.2; 382/277, 248, 250

[56] References Cited

U.S. PATENT DOCUMENTS

| | | | |
|---|---|---|---|
| 4,829,465 | 5/1989 | Knauer et al. | 364/725 |
| 4,912,668 | 3/1990 | Aubie et al. | 364/725 |
| 5,181,183 | 1/1993 | Miyazaki | 364/725.03 |
| 5,285,402 | 2/1994 | Keith | 364/725 |
| 5,345,408 | 9/1994 | Hoogenboom | 364/725.03 |
| 5,361,220 | 11/1994 | Asano | 364/725.02 |
| 5,467,131 | 11/1995 | Bhaskaran et al. | 348/384 |
| 5,550,765 | 8/1996 | Bhattacharya et al. | 364/725 |
| 5,594,678 | 1/1997 | Jones et al. | 364/725 |
| 5,598,361 | 1/1997 | Nagamatsu et al. | 364/725.03 |
| 5,629,882 | 5/1997 | Iwata | 364/725 |
| 5,675,387 | 10/1997 | Hoogenboom et al. | 348/416 |

Primary Examiner—Emmanuel L. Moise

[57] ABSTRACT

An Inverse Discrete Cosine Transform processor employs symmetry and reusable elements to use a fewer number of gates while maintaining processing speed at an acceptable level. Even and odd sums are generated simultaneously by even and odd sum generators. A butterfly operation is then performed on the on the even and odd sums to produce pairs of transformed elements simultaneously. For an 8×8 block, the even and odd sum generators can be designed to a generate four pairs of even and odd sums sequentially. This design allows a single row or column of eight elements to be processed in 4 clock cycles. A horizontal transformation on all eight rows of the block can be performed in 32 cycles. A vertical transformation can then be performed by storing the transformed rows in a second memory, reading out columns from the second memory, and using the same hardware to generate the sums and perform the butterfly operation on the columns. An entire two-dimensional transformation can be performed in only 64 clock cycles.

16 Claims, 2 Drawing Sheets

SUPER-COMPACT HARDWARE ARCHITECTURE FOR IDCT COMPUTATION

BACKGROUND OF THE INVENTION

The invention relates to transform coding. More specifically, the invention relates to Discrete Cosine Transforms and Inverse Discrete Cosine Transforms.

Popularity of digital video is on the rise. High quality, full-motion digital video images are now being transmitted over the airwaves from satellites to homes equipped with small satellite dishes and integrated decoders/receivers. The dishes and integrated decoders/receivers have become so popular, in fact, that they have become the fastest selling consumer electronics product ever to enter the market. Lower quality digital video images suitable for teleconferencing are being transmitted over the telephone lines by digital ISDN systems. More and more companies are realizing that they can save time and money by holding meetings via teleconferencing instead of meeting in-person. Digital video images can now be viewed on personal computers. The video images are available on CD ROMs, and they are now being made available over the ever-popular Internet.

Future success of digital video will depend upon the ability to increase the compression of the digital video images, and to do so at affordable prices. Compression reduces the amount of information describing the digital video images, yet retains the quality of the video images. It is accomplished partly by eliminating redundant information in the video images. Digital video images contain a massive number of bits of information. The number of bits is proportional to the quality of the image. As more bits are used, the images become sharper, clearer and more life-like. A single high quality digital video image is made up of millions of bits of information. The amount of information is further increased because the video images in full-motion video must be updated many times per second to reduce flickering. Flicker-free video requires the images to be updated thirty times per second. This would normally be too much information to transmit within a fixed bandwidth and displayed in real time. However, compression allows all of this to happen.

The Discrete Cosine Transform (DCT) and Inverse Discrete Cosine Transform (IDCT) are the basic functions used in many current compression/decompression algorithms for digital video. The DCT transforms a two-dimensional image from the spatial domain into the frequency domain. This transformation allows for redundancy in the video images to be reduced and the video image to be described and transmitted using fewer bits. The IDCT is used to transform the image back to the spatial domain. The complexity of the transformations grow exponentially with the size of the image, so the transforms are typically performed on small 8×8 blocks.

Even for an 8×8 block, the IDCT is still quite complex, requiring 1024 multiplies and 896 adds. A 720×480 image requires an IDCT to be performed on 8100 such blocks, all within 33 milliseconds. This works out to over 466,500,000 operations per second. Even for an IDCT processor designed to run at 27 MHZ, this comes out to an average of 18 operations every clock cycle, 10 of which would be multiplies. Designing an IDCT processor with a straight-forward implementation would undoubtedly be very large. Using 60% of available computational bandwidth, which is fairly typical, the design would require 16 multipliers and adders, or about 46,000 gates.

Real-world designs are desired to be quite a bit smaller. Architectures of IDCT processors have been known to merge multiple multiplications and additions into single MAC operations. Still, the real world architectures simply use too many gates and take up too much area. Larger architectures cost more to fabricate than smaller architectures. Depending on where the profit margins are, the supplier can either pass the fabrication cost off to the consumer or take less profit.

Much research and effort has been devoted to finding esoteric IDCT algorithms that reduce the number of operations performed by IDCT processors. There are a myriad of papers describing new-fangled ways to compute IDCTs using fewer operations, particularly fewer multiplications. The general consensus seems to be that an IDCT algorithm with a fewer number of multiplications is better.

SUMMARY OF THE INVENTION

It is an objective of the present invention to provide a processor that has more symmetry and more reusable elements. This objective translates into a processor having a fewer number of gates, not necessarily a fewer number of operations.

It is a further objective to provide a processor that performs more parallel operations, not serial operations.

A processor according to the present invention comprises first memory for storing blocks of data and reading out the data in a first direction (the data being read out in vectors having 2n elements); an even sum generator that generates even sums from even elements of the vectors read out of the first memory; an odd sum generator that generates odd sums from odd elements of the vectors read out of the first memory; a first adder that adds together the even and odd sums; and a subtracter that subtracts the odd sums from the even sums. The operations of the first adder and subtracter are performed simultaneously.

A transformation in a second direction can be performed by storing the results of the first adder and subtracter in additional memory, reading out vectors from the additional memory in a direction other than the first direction; and processing the vectors with the even sum generator, odd sum generator, adder and subtracter.

The blocks of data can be scaled prior to storage in the first memory or results of the even and odd sum generators can be scaled. When scaling is performed prior to storage in the first memory, the processor performs an IDCT on the blocks of data. When scaling is performed on the results of the adder and subtracter, the processor performs a DCT on the blocks of data.

DETAILED DESCRIPTION OF THE INVENTION

Figure 1:
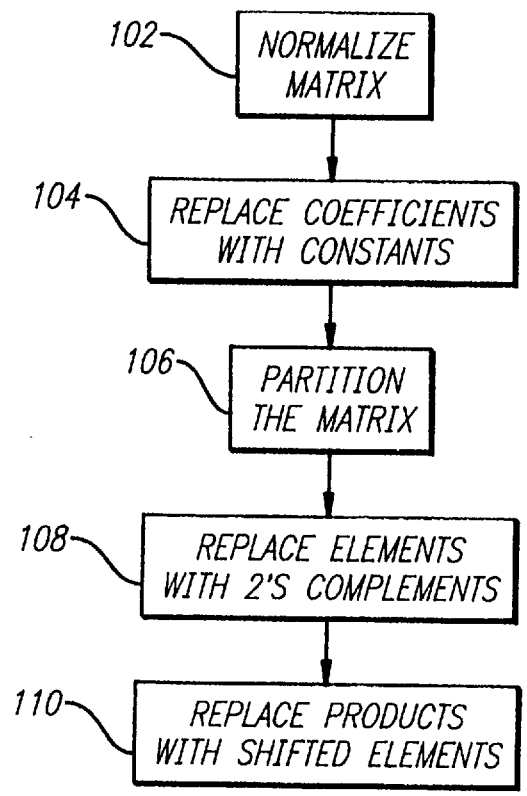
FIG. 1 is a flowchart of a method of exploiting an IDCT matrix for use by an IDCT processor in accordance with the present invention.

FIG. 1 shows the steps performed to design an IDCT processor according to the present invention. The processor is based on an IDCT matrix having redundancies and regularities in its coefficients. These redundancies and regularities are exploited to reduce computational complexity of performing the IDCT. One such matrix T, shown below, is an 8×8 transform matrix for calculating an 8-point IDCT.

The matrix is composed of sixty four coefficients, each coefficient representing a different multiplication.

$$T = \begin{bmatrix} \frac{1}{\sqrt{2}} & \frac{1}{\sqrt{2}} & \frac{1}{\sqrt{2}} & \frac{1}{\sqrt{2}} & \frac{1}{\sqrt{2}} & \frac{1}{\sqrt{2}} & \frac{1}{\sqrt{2}} & \frac{1}{\sqrt{2}} \\ \cos\frac{\pi}{16} & \cos\frac{3\pi}{16} & \cos\frac{5\pi}{16} & \cos\frac{7\pi}{16} & -\cos\frac{7\pi}{16} & -\cos\frac{5\pi}{16} & -\cos\frac{3\pi}{16} & -\cos\frac{\pi}{16} \\ \cos\frac{2\pi}{16} & \cos\frac{6\pi}{16} & \cos\frac{10\pi}{16} & \cos\frac{14\pi}{16} & \cos\frac{14\pi}{16} & \cos\frac{10\pi}{16} & \cos\frac{6\pi}{16} & \cos\frac{2\pi}{16} \\ \cos\frac{3\pi}{16} & \cos\frac{9\pi}{16} & \cos\frac{15\pi}{16} & \cos\frac{21\pi}{16} & -\cos\frac{21\pi}{16} & -\cos\frac{15\pi}{16} & -\cos\frac{9\pi}{16} & -\cos\frac{3\pi}{16} \\ \cos\frac{4\pi}{16} & \cos\frac{12\pi}{16} & \cos\frac{20\pi}{16} & \cos\frac{28\pi}{16} & \cos\frac{28\pi}{16} & \cos\frac{20\pi}{16} & \cos\frac{12\pi}{16} & \cos\frac{4\pi}{16} \\ \cos\frac{5\pi}{16} & \cos\frac{15\pi}{16} & \cos\frac{25\pi}{16} & \cos\frac{35\pi}{16} & -\cos\frac{35\pi}{16} & -\cos\frac{25\pi}{16} & -\cos\frac{15\pi}{16} & -\cos\frac{5\pi}{16} \\ \cos\frac{6\pi}{16} & \cos\frac{18\pi}{16} & \cos\frac{30\pi}{16} & \cos\frac{42\pi}{16} & \cos\frac{42\pi}{16} & \cos\frac{30\pi}{16} & \cos\frac{18\pi}{16} & \cos\frac{6\pi}{16} \\ \cos\frac{7\pi}{16} & \cos\frac{21\pi}{16} & \cos\frac{35\pi}{16} & \cos\frac{49\pi}{16} & -\cos\frac{49\pi}{16} & -\cos\frac{35\pi}{16} & -\cos\frac{21\pi}{16} & -\cos\frac{7\pi}{16} \end{bmatrix}$$

FIG. 1 shows the steps performed to exploit these regularities and redundancies when designing an IDCT processor. In step 102, the transform matrix T is normalized or scaled so that many of the coefficients become equal to 1. Scaling reduces and simplifies the IDCT processor architecture because multipliers are not needed to multiply by 1. Instead, simple add operations can be performed. An 8-point scaling matrix S for the matrix T is shown below.

In step 104, the remaining coefficients are all expressed in terms of just three constants—a, b and c—by using basic trigonometric identities. The normalized matrix N, expressed in terms of constants a, b and c, is also shown below.

$$S = \begin{bmatrix} \frac{1}{\sqrt{2}} & \frac{1}{\sqrt{a^2+1}} & \frac{1}{\sqrt{b^2+1}} & \frac{1}{\sqrt{c^2+1}} & \frac{1}{\sqrt{2}} & \frac{1}{\sqrt{c^2+1}} & \frac{1}{b^2+1} & \frac{1}{a^2+1} \end{bmatrix}$$

$$N = \begin{bmatrix} 1 & 1 & 1 & 1 & 1 & 1 & 1 & 1 \\ a & \left(\frac{b-1}{2}\right)(a+1) & \left(\frac{b-1}{2}\right)(a-1) & 1 & -1 & -\left(\frac{b-1}{2}\right)(a-1) & -\left(\frac{b-1}{2}\right)(a+1) & -a \\ b & 1 & -1 & -b & -b & -1 & 1 & b \\ c & -\left(\frac{b-1}{2}\right)(c-1) & -\left(\frac{b-1}{2}\right)(c+1) & -1 & 1 & -\left(\frac{b-1}{2}\right)(c+1) & \left(\frac{b-1}{2}\right)(c-1) & -c \\ 1 & -1 & -1 & 1 & 1 & -1 & -1 & 1 \\ 1 & -\left(\frac{b-1}{2}\right)(c+1) & \left(\frac{b-1}{2}\right)(c-1) & c & -c & -\left(\frac{b-1}{2}\right)(c-1) & \left(\frac{b-1}{2}\right)(c+1) & -1 \\ 1 & -b & -b & -1 & -1 & b & -b & 1 \\ 1 & -\left(\frac{b-1}{2}\right)(a-1) & \left(\frac{b-1}{2}\right)(a+1) & -a & a & -\left(\frac{b-1}{2}\right)(a+1) & \left(\frac{b-1}{2}\right)(a-1) & -1 \end{bmatrix}$$

where $$a = \tan\frac{7\pi}{16}$$

$$b = \tan\frac{6\pi}{16}$$

$$c = \tan\frac{5\pi}{16}$$

$$\left(\frac{b-1}{2}\right) = \frac{1}{\sqrt{2}} = 0.7071$$

In step 106, the matrix N is partitioned. Many of the same patterns and redundancies of the original transform matrix still exist, including the matching of columns necessary for a "butterfly" operation. It can be seen that the coefficients in left half (columns 0 through 3) of the normalized matrix N are identical to those in the right half (columns 7 through 4), except for the sign. Furthermore, the signs of the even rows (rows 0, 2, 4 and 6) of the normalized matrix N are the same on both sides, while the signs of the odd rows (rows 1, 3, 5, and 7) on the right side are the opposite of those on the left side. This allows the normalized matrix N to be split vertically right down the middle and horizontally along the even and odd-numbered rows. This partitioning allows for the "butterfly" operation to be performed.

The butterfly operation is illustrated by the following example. Let $X_{0-7}$ be an input matrix that has been scaled by matrix $S_{0-7}$. Elements $E_{0-7}$ are the result of the input matrix $X_{0-7}$ being multiplied by the normalized matrix N.

Elements $E_0$ and $E_7$ are expressed as:

$$E_0 = X_0 + a X_1 + b X_2 + c X_3 + X_4 + X_5 + X_6 + X_7$$

$$E_7 = X_0 - a X_1 + b X_2 - c X_3 + X_4 - X_5 + X_6 - X_7$$

or $$E_0 = EVEN_0 + ODD_0$$

$$E_7 = EVEN_0 - ODD_0$$

where $$EVEN_0 = X_0 + bX_2 + X_4 + X_6$$

$$ODD_0 = aX_1 + cX_3 + X_5 + X_7$$

The remaining elements $E_1$ to $E_6$ can be grouped and expressed in the same manner:

$$E_1 = EVEN_1 + ODD_1$$
$$E_6 = EVEN_1 - ODD_1$$

$$E_2 = EVEN_2 + ODD_2$$
$$E_5 = EVEN_2 - ODD_2$$

$$E_3 = EVEN_3 + ODD_3$$
$$E_4 = EVEN_3 - ODD_3$$

where $$EVEN_1 = X_0 + X_2 - X_4 - bX_6$$
$$EVEN_2 = X_0 - X_2 - X_4 - bX_6$$
$$EVEN_3 = X_0 - bX_2 + X_4 - X_6$$

$$ODD_1 = (b - 1)/2[(a + 1)X_1 - (c - 1)X_3 - (c + 1)X_5 - (a - 1)X_7]$$
$$ODD_2 = (b - 1)/2[(a - 1)X_1 - (c + 1)X_3 - (c - 1)X_5 + (a - 1)X_7]$$

$$ODD_3 = X_1 - X_3 + cX_5 - aX_7$$

Thus, the only differences between the EVEN and ODD sums above are that the constants a, b and c are sometimes increased or decreased by 1, and that the ODD sum is sometimes multiplied by the constant (b−1)/2, which is approximately equal to 0.7071. All this commonality leads to an architecture that uses common hardware to calculate the EVEN sums, the ODD sums, and to optionally multiply by 0.7071 for each of the four equation sets. This is an advantage of the butterfly operation.

In step 108, computational efficiency of the IDCT processor can be further increased by modifying the EVEN and ODD sums using Boolean algebra and a 2's complement notation. Setting $$-X = \bar{X} + 1$$

where $\bar{X}$ = logical inverse of X, the ODD and EVEN sums are expressed as $$EVEN_0 = X_0 + X_6 + \underline{X_4} + b\underline{X_2} + (0)$$
$$EVEN_1 = X_0 + X_2 + \overline{X_4} + b\overline{X_6} + (b + 1)$$
$$EVEN_2 = X_0 + \overline{X_2} + \underline{X_4} + b\overline{X_6} + (b + 2)$$
$$EVEN_3 = X_0 + X_6 + X_4 + b\overline{X_2} + (b + 1)$$

$$ODD_0 = aX_1 + cX_3 + X_5 + X_7 + (0)$$

$$ODD_1 =$$

$$\frac{b-1}{2} [(a + 1)X_1 + (c - 1)\overline{X_3} + (c + 1)\overline{X_5} + (a - 1)\overline{X_7} + (2c + a - 1)]$$

$$ODD_2 =$$

$$\frac{b-1}{2} [(a - 1)X_1 + (c + 1)\overline{X_3} + (c - 1)X_5 + (a + 1)X_7 + (c + 1)]$$

$$ODD_3 = X_1 + \overline{X_3} + cX_5 + a\overline{X_7} + (a + 1)$$

In step 110, the computationally efficiency can be increased even further by expressing the products of elements and constants a, b and c as $$(a)X \cong 5.0273(X) \cong 4X + X + \frac{X}{32} - \frac{X}{256}$$

$$(a + 1)X \cong 6.0273(X) \cong 4X + 2X + \frac{X}{32} - \frac{X}{256}$$

$$(a - 1)X \cong 4.0273(x) \cong 4X + 0X + \frac{X}{32} - \frac{X}{256}$$

$$b(X) \cong 2.4142(X) \cong 2X + \frac{X}{4} + \frac{X}{8} + \frac{X}{32} + \frac{X}{128}$$

$$(c)X \cong 1.4996(X) \cong X + \frac{X}{2} - \frac{X}{256}$$

$$(c + 1)X \cong 2.4996(X) \cong 2X + \frac{X}{2} - \frac{X}{256}$$

$$(c - 1)X \cong 0.4996(X) \cong 0 + \frac{X}{2} - \frac{X}{256}$$

The EVEN sums can be expressed as follows in equations (1) to (4).

$$EVEN_0 = [X_0] + \left[ 2X_2 + 0 + \frac{X_2}{4} + \frac{X_2}{8} + \frac{X_2}{32} - \frac{X_2}{128} \right] + \quad (1)$$

$$[X_4] + [0 + X_6 + 0 + 0 + 0 + 0] + (0.00)$$

$$EVEN_1 = [X_0] + [0 + X_2 + 0 + 0 + 0 + 0] + [\overline{X_4}] + \quad (2)$$

$$\left[ 2\overline{X_6} + 0 + \frac{\overline{X_6}}{4} + \frac{\overline{X_6}}{8} + \frac{\overline{X_6}}{32} + \frac{\overline{X_6}}{128} \right] + (3.4)$$

$$EVEN_2 = [X_0] + [0 + \overline{X_2} + 0 + 0 + 0 + 0] + [\underline{X_4}] + \quad (3)$$

$$\left[ 2\overline{X_6} + 0 + \frac{\overline{X_6}}{4} + \frac{\overline{X_6}}{8} + \frac{\overline{X_6}}{32} + \frac{\overline{X_6}}{128} \right] + (4.40)$$

$$EVEN_3 = [X_0] + \left[ 2\overline{X_2} + 0 + \frac{\overline{X_2}}{4} + \frac{\overline{X_2}}{8} + \frac{\overline{X_2}}{32} - \frac{\overline{X_2}}{128} \right] + \quad (4)$$

$$[X_4] + [0 + \overline{X_6} + 0 + 0 + 0 + 0] + (0.00)$$

The ODD sums can be expressed as follows in equations (5) to (8).

$$ODD_0 = \left[ 4X_1 + X_1 + \frac{X_1}{32} - \frac{X_1}{256} \right] + \left[ X_3 + \frac{X_3}{2} - \frac{X_3}{256} \right] + \quad (5)$$

$$[X_5 + 0 + 0] + [0 + X_7 + 0 + 0] + (0.00)$$

-continued $$ODD_1 = \left[ 4X_1 + 2X_1 + \frac{X_1}{32} - \frac{X_1}{256} \right] + \left[ 0 + \frac{\overline{X_3}}{2} - \frac{\overline{X_3}}{256} \right] + \quad (6)$$

$$\left[ 2\overline{X_5} + \frac{\overline{X_5}}{2} - \frac{\overline{X_5}}{256} \right] + \left[ 4\overline{X_7} + 0 + \frac{\overline{X_7}}{32} - \frac{(\overline{X})_7}{256} \right] + (7.00)$$

$$ODD_2 = \left[ 4X_1 + 0 + \frac{X_1}{32} - \frac{X_1}{256} \right] + \left[ 2\overline{X_3} + \frac{\overline{X_3}}{2} - \frac{\overline{X_3}}{256} \right] + \quad (7)$$

$$\left[ 0 + \frac{X_5}{2} - \frac{X_5}{256} \right] + \left[ 4X_7 + 2X_7 \frac{X_7}{32} - \frac{X_7}{256} \right] + (2.50)$$

$$ODD_3 = [0 + X_1 + 0 + 0] + [\overline{X_3} + 0 + 0 + 0] + \quad (8)$$

$$\left[ X_5 + \frac{X_5}{2} - \frac{X_5}{256} \right] + \left[ 4\overline{X_7} + \overline{X_7} + \frac{\overline{X_7}}{32} - \frac{\overline{X_7}}{256} \right] + (6.00)$$

Figure 2:
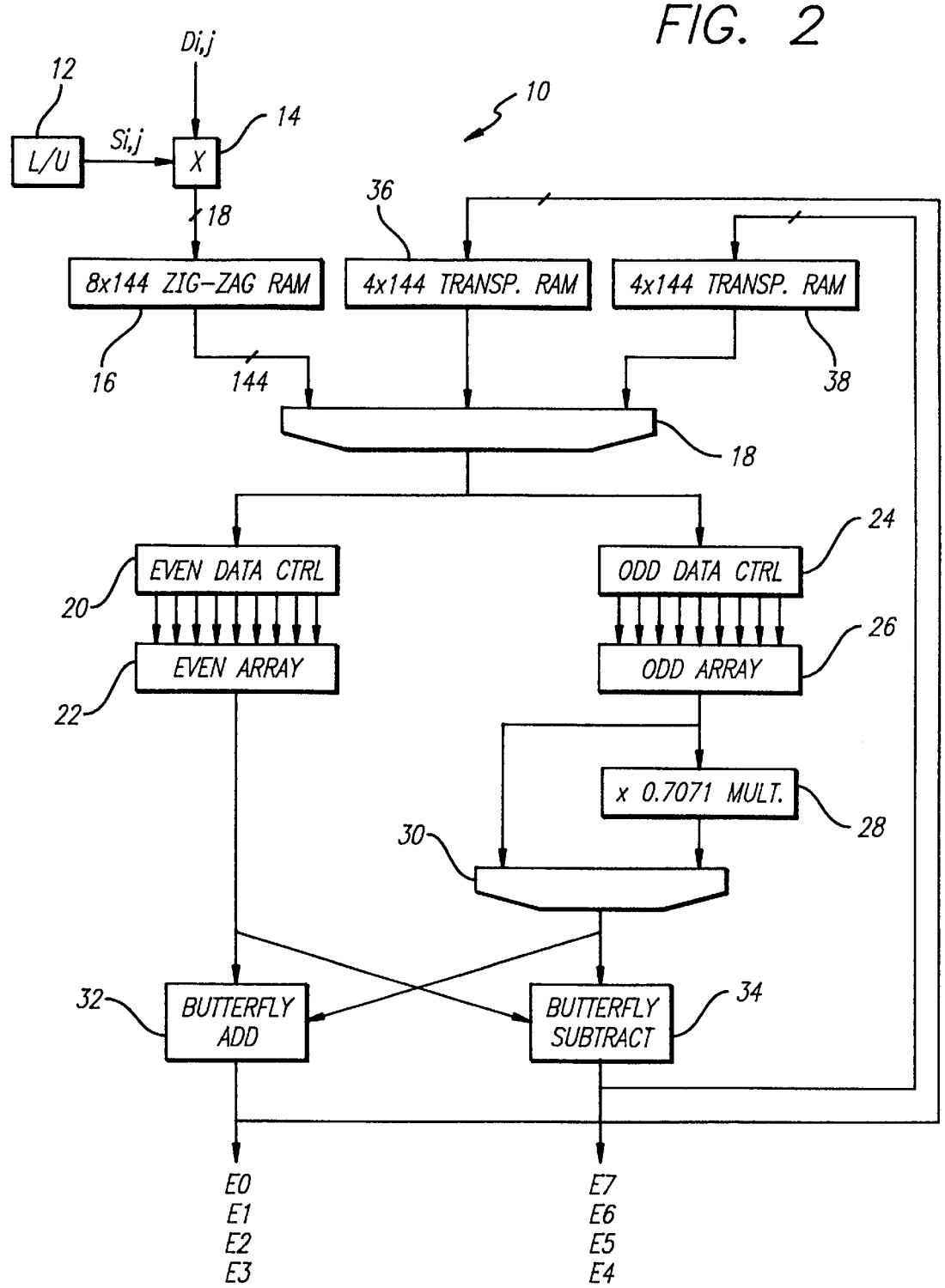
FIG. 2 is a block diagram of the IDCT processor.

FIG. 2 shows an IDCT processor 10 that transforms 8×8 blocks of data utilizing the right hand sides of equations (1) to (8). A stream of data $D_{i,j}$, is provided to the processor 10 (where $0 \leq i \leq 7$, and $0 \leq j \leq 7$). The data $D_{i,j}$ can be provided sequentially or non-sequentially, depending on the system supplying the data. In MPEG systems, data $D_{i,j}$ is supplied in a zig-zag order. For example, zig-zagged data $D_{i,j}$ could be provided in the following order: $D_{1,1}, D_{1,2}, D_{2,1}, D_{3,1}, D_{2,2}, D_{1,3}$, etc. The data $D_{i,j}$ can be of any specified word length. In MPEG systems, the word length is specified at 18 bits.

Scaling of each 8×8 block can be done in a number of ways. For example, the 8×8 blocks can be multiplied by an 8×8 scaling matrix $S_{i,j}$, or the 8×8 blocks can be multiplied by a scaling vector $S_i$ and then multiplied again by a scaling vector $*S_i$. The scaling vectors $S_i$ and $*Si$ or the scaling matrix $S_{i,j}$ can be stored in a lookup table 12 and can be multiplied with the data $D_{i,j}$ by a first multiplier 14. The gate count for the lookup table 12 is roughly 160 gates, and the gate count for the first multiplier 14 is roughly 2500 gates.

The scaled data is stored in an 8×144 Zig-Zag RAM 16, which reorders the scaled data and stores it into a block consisting of 8 rows of 8×1 scaled input matrices. If, however, the scaled data is supplied sequentially (i.e., row-by-row or column-by-column) instead of a zig-zagged order, an 8×144 register can be used in place of the Zig-Zag RAM 16.

Once a complete row is available in the Zig-Zag RAM 16, it is read out and supplied to one input of a first multiplexer 18 (the first multiplexer 18 has two other inputs). A state machine selects the input corresponding to the Zig-Zag RAM 16. Even elements in the row are supplied to an EVEN Data Control 20 and EVEN Array 22, and odd elements in the row are supplied to an ODD Data Control 24 and ODD Array 26.

The EVEN Data Control 20 uses selective data inversion, shifting, and multiplexing to form the terms that go to the EVEN Array 22. The terms are shown in equations (1)–(4). The first term in equations (1)–(4) is $X_0$. Therefore, $X_0$ is passed on directly to the EVEN Array 22. The second term in equations (1)–(4) is either $2X_2$, 0 or 2 (inverted $X_2$). The second term can be generated by selectively shifting $X_2$, selectively inverting $X_2$, and selecting the constant zero, the shifted and inverted $X_2$ or the shifted $X_2$. The remaining terms for equations (1) to (4) are generated in a similar manner. Multiplication is performed by shifting to the left, division is performed by shifting to the right, inversion is performed by inverters, and constants are supplied by a lookup table or a state machine. Nine non-zero terms are provided by the EVEN Data Control 20. The EVEN Data Control 20 can be implemented with as few as 280 gates.

The EVEN Array 22 can be implemented as a 9-input Wallace tree that adds up all the non-zero terms from the EVEN Data Control 20. The gate count can be quite small. A 9-input Wallace-tree with a carry-select adder can be implemented with approximately 1300 gates. The EVEN Array 22 has an output bus-width of 22 bits, which is needed for IEEE accuracy requirements. The output of the EVEN Array 22 provides the $EVEN_0$, $EVEN_1$, $EVEN_2$ and $EVEN_3$ sums in sequence.

The ODD Data Control 24 also uses selective data inversion, shifting, and multiplexing to form the terms that go to the ODD Array 26. The first term of equations (5)–(8) is either $4X_1$ or a constant 0. The first term can be generated by shifting $X_1$ to the left by two bits and selecting either $4X_1$ or the constant 0. The second term, which is either $X_1$, $2X_1$ or the constant 0, can also be generated by selective shifting and multiplexing. As above, multiplication is performed by shifting to the left, division is performed by shifting to the right, inversion is performed by inverters, and constants are supplied by a lookup table or a state machine. The remaining terms of equations (5) to (8) are generated in a similar manner. The ODD Data Control 24 provides thirteen non-zero terms. It can be implemented with as few as 530 gates.

The ODD Array 26 can be implemented as a 13-input Wallace tree that adds up the thirteen non-zero terms from the ODD Data Control 24. A 13-input Wallace-tree with a carry-select adder can be implemented with approximately 1900 gates. As with the EVEN Array 22, the output of the ODD Array 26 must be at least 22 bits wide to meet IEEE accuracy requirements. The output of the ODD Array 26 provides the $ODD_0$, $ODD_1$, $ODD_2$ and $ODD_3$ sums in sequence.

The $ODD_1$ and $ODD_2$ sums from the ODD Array 26 must be multiplied by $(b-1)/2$. A second multiplier 28 can perform the multiplication as follows:

$$\left( \frac{b-1}{2} \right) ODD_l \cong$$

$$\frac{ODD_l}{2} + \frac{ODD_l}{8} + \frac{ODD_l}{16} + \frac{ODD_l}{64} + \frac{ODD_l}{256} \text{ where } l = 1, 2.$$

Multiplying the $ODD_1$ and $ODD_2$ sums by shifting and adding allows the second multiplier 28 to be implemented as a 5-input Wallace tree having a carry-select adder in the final stage. Thus, the second multiplier 28 can have a structure similar to the EVEN and ODD Arrays 22 and 26. The output of the second multiplier 28 is also 22-bits wide. The gate count of the second multiplier 28 is approximately 800 gates.

It is shown that all ODD sums are multiplied by the second multiplier 28, and that a second multiplexer 30 selects the output of the second multiplier 28 when the $ODD_1$ and $ODD_2$ sums are generated and the output of the ODD Array 26 when the $ODD_0$ and $ODD_3$ sums are generated. Selection can be made by a state machine (not shown). The second multiplexer 30 requires about 70 gates. In the alternative, the second multiplier 28 can be provided with control logic for performing selective multiplications. Although the control logic allows the second multiplexer 30 to be eliminated, it increases the gate count of the second multiplier 28.

A butterfly adder 32 adds together the outputs of the EVEN Array 22 and the second multiplexer 30 to generate the elements $E_0$, $E_1$, $E_2$ and $E_3$. Simultaneously, a butterfly subtracter 34 subtracts the output of the second multiplexer 30 from the output of the EVEN Array 22 to generate the elements $E_7$, $E_6$, $E_5$ and $E_4$. Subtraction can be performed for example, by taking the 2's complement of the output of the second multiplexer 30 and adding it to the output of the EVEN Array 22. The butterfly adder 32 can be a 22-bit adder having a gate count of approximately 430 gates, and the butterfly subtracter 34 can be a 22-bit subtracter having a gate count of approximately 480 gates.

An output of the butterfly adder 32 is provided to a first 4×144 Transpose RAM 36, and an output of the butterfly subtracter 34 is provided to a second 4×144 Transpose RAM 38. The transpose RAMs 36 and 38 cooperate to store an entire 8×8 block, and read out the block in a vertical direction (the blocks were read out of the Zig-Zag RAM 16 in a horizontal direction). When the elements $E_0$ and $E_7$ are generated, element $E_0$ is stored at location 1,1 of the first Transpose RAM 36 while element $E_7$ is stored at location 1,4 of the second Transpose RAM 38. With subsequent elements $E_{1-6}$, the element $E_1$ is stored at location 1,2 of the first Transpose RAM 36 while the element $E_6$ is stored at location 1,3 of second Transpose RAM 38, the element $E_2$ is stored at location 1,3 of the first Transpose RAM 36 while the element $E_5$ is stored at location 1,2 of second Transpose RAM 38, and the element $E_3$ is stored at location 1,4 of the first Transpose RAM 36 while the element $E_4$ is stored at location 1,2 of second Transpose RAM 38.

Once a column is available in the Transpose RAMS 36 and 38, that column is read out to the first multiplexer 18. The state machine selects the two multiplexer inputs corresponding to the Transpose RAMs 36 and 38, and the even and odd elements of the column are provided to the EVEN and ODD Data Controls 20 and 24, respectively.

A two-dimensional IDCT on an 8×8 block is performed by the processor 10 as follows. First, the processor 10 performs a horizontal transform, and then it performs a vertical transform. During the horizontal transform, a row is supplied by the Zig-Zag RAM 16, with the even elements being split off and sent to the EVEN Data Control 20 for calculation of the $EVEN_0$, $EVEN_1$, $EVEN_2$ and $EVEN_3$ sums and the odd elements being split off and sent to the ODD Data Control 24 Array for calculation of the $ODD_0$, $ODD_1$, $ODD_2$ and $ODD_3$ sums. The ODD sums are multiplied by the constant 0.7071, with only the terms $0.7071ODD_2$ and $0.7071ODD_3$ being selected by the second multiplexer 30. A butterfly operation is performed by the butterfly adder 32 and subtracter 34. The elements $E_{0-7}$ are generated simultaneously in pairs: $E_0$ and $E_7$, $E_1$ and $E_6$, $E_2$ and $E_5$, and $E_3$ and $E_4$. Only four clock cycles are required to generate all four pairs. Only 32 clock cycles are required to complete the horizontal transformation on the entire 8×8 block.

The resulting rows of the one-dimensional IDCT are stored in the Transpose RAMs 36 and 38 as columns. Then the columns are read out of the Transpose RAMs 36 and 38, and the vertical transformation is performed. Again, only four clock cycles are required to generate the EVEN and ODD sums for each column. Performing the vertical transform on the entire 8×8 block takes just 32 cycles.

The IDCT 10 processor has only 6000 gates, yet requires only 64 clock cycles to perform the two-dimensional transformation. At an operating frequency of 27 MHZ, the IDCT processor 10 easily meets the throughput requirements for an MPEG-2 system.

The IDCT processor 10 can be fabricated on a single chip made of Silicon or Gallium Arsenide. Using the architecture and operating frequency described above, silicon is preferred because it is slightly faster. The slightly faster silicon allows the multipliers and adders to use ripple adders in place of the carry-select adders. This saves about 500 gates, bringing the overall total down to 5500 gates.

The processor 10 can be operated at frequencies other than 27 MHZ. For example, the operating frequency could be boosted to 54 MHZ. The boosted frequency would allow the IDCT processor 10 to perform the same operations in half the time, or it would allow the IDCT processor 10 to perform the same operations in the same amount of time, but using fewer gates. The gate count could be reduced as much as 35% for an operating frequency of 54 MHZ.

Thus disclosed is an IDCT processor 10 with less latency and fewer gates than conventional IDCT processors. Fewer gates, in turn, reduce power consumption and allow the IDCT processor 10 to be fabricated on a smaller chip. Because a smaller chip die results in a better yield, the actual cost savings per die is increased. What this all means is a dramatically reduced silicon cost and/or increased profit margin for the IDCT processor 10.

Figure 3:
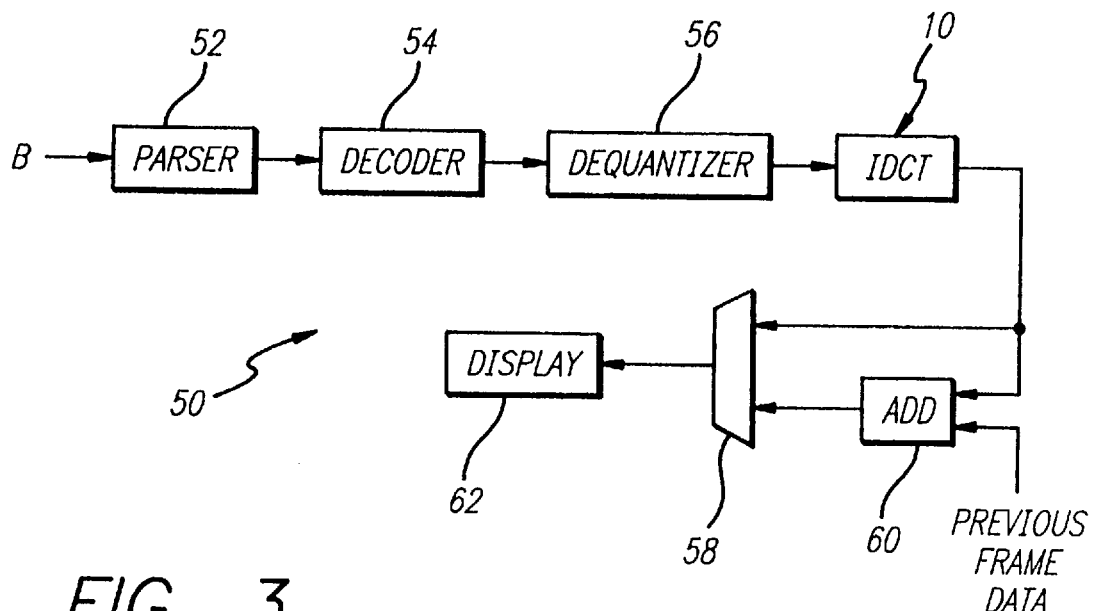
FIG. 3 is a block diagram of a video decoder that uses the IDCT processor shown in FIG. 2.

FIG. 3 shows a video decoder 50 that uses the IDCT processor 10. A bitstream B containing a formatted video signal is supplied to the decoder 50. The bitstream B can be formatted according to any standard, such as MPEG (full-motion video images), JPEG (still-frame video images) and H.261 (images for video phones). According to the MPEG standard, the incoming bitstream B includes not only video information but also transmission headers. The incoming bitstream B is supplied to a parser 52, which parses out the information in the transmission headers (e.g., an identifier, size of image, a quantization table and Huffman bits). The parsed bitstream provided by the parser 52 is converted from a variable length code to a fixed length code by a decoder 54 such as a Huffman decoder. The fixed length code is dequantized according to any well known dequantizer 56 to produce a stream of video data $D_{i,j}$. The data $D_{i,j}$ is supplied to the IDCT processor 10. Video frames are provided on an output of the IDCT processor 10.

The frames from the IDCT processor 10 are supplied to a multiplexer 58 and a frame adder 60. If the frame is an intra frame (I-frame), the multiplexer 58 sends the frame directly to a display device 62 for display. If the frame is a prediction frame (P-frame) containing only incremental changes in pixel values from the previous frame or it is a bi-directional frame (B-frame) containing pixel values that are coded with respect to both an earlier frame and a later frame, the frame adder 60 adds the P-frame or B-frame to previous frame data, and the multiplexer 58 sends the output of the frame adder 60 to the display device 62.

It is understood that various changes and modifications may be made without departing from the spirit and scope of the invention. Block size of the data is not limited to 8 rows and 8 columns. The block size, which could be greater or smaller, is typically determined by system specifications.

Additional pairs of transpose RAMs could be used for processing in additional dimensions. The transpose RAMs could be eliminated altogether if processing is performed in one dimension only.

For two-dimensional processing, columns of blocks could be read out and processed before the rows are read out and processed. Thus, a vertical transformation could be performed and stored in the Transpose RAM. Then, a horizontal transformation could be performed on the block stored in the Transpose RAMs.

Moreover, the invention is not limited to IDCT processors. A Discrete Cosine Transform Processor could employ the same architecture, except that scaling would be done at the back end.

The processor architecture can be applied to current MPEG, DigiCipher, and JPEG applications currently begin used in a wide array of consumer products employing video compression such as DBS, cable TV and DAB systems. It can be readily modified for HDTV by using four Transpose RAMs instead of two.

Accordingly, various modifications can be made without departing from the spirit and scope of the invention as defined by the claims that follow.

I claim:

1. A processor for performing a cosine transform on blocks of data, the processor comprising:

a first multiplier for scaling the blocks of data into blocks of scaled data;

a first memory for storing the blocks of scaled data and reading out the scaled data in a first direction, the scaled data being read out in vectors having 2n elements, where n is a positive integer;

an even sum generator that generates even sums from even elements of the vectors read out of the first memory;

and odd sum generator that generates odd sums from odd elements of the vectors read out of the first memory;

a first adder that adds together the even and odd sums; and a subtracter that subtracts the odd sums from the even sums, the operations of the first adder and subtracter being performed simultaneously;

wherein the even sum generator includes a first control for generating terms from the even elements of the vectors read out of the first memory, and a second adder for summing the terms generated by the first control;

wherein the odd sum generator includes a second control for generating terms from the odd elements of the vectors read out of the first memory, a third adder for summing the terms generated by the second control, and means for selectively multiplying the odd sums generated by the third adder with a constant value, whereby the first and second data controls generate terms for n different pairs of odd and even sums; and wherein the means for selectively multiplying includes a second multiplier for multiplying an output of the odd sum generator with the constant value; and a multiplexer having a first input coupled to an output of the odd sum generator and a second input coupled to an output of the multiplier, the first input being selected when it is not desired to multiply the odd sum by the constant value, the second input being selected when it is desired to multiply the odd sum by the constant value.

2. The processor of claim 1, wherein the second and third adders are Wallace tree adders.

3. The processor of claim 1, wherein the first data control performs selective shifting on the even elements, and the second adder adds selectively shifted terms together to generate first sums; and wherein the second data control performs selective shifting on the odd elements, and the third adder adds selectively shifted terms together to generate second sums.

4. The processor of claim 1, wherein the second multiplier includes a plurality of shifters and a Wallace tree adder for adding together outputs of the shifters.

5. The processor of claim 1, wherein the first memory includes a Zig-Zag RAM.

6. The processor of claim 1, further comprising:

additional memory for storing the outputs of the first adder and subtracter, vectors of 2n elements being read out of the additional memory in a direction other than the first direction; and a multiplexer for selecting the vectors read out from either the first memory or the additional memory, whereby transformations in additional directions are performed by selecting the vectors read out from the additional memory.

7. The processor of claim 1, wherein the scaled data is a matrix of 1's, 0's and constants, and wherein the vectors are multiplied by the matrix via the even and odd sum generators.

8. The processor of claim 1, further comprising means for scaling the results of the even and odd sum generators, whereby the processor performs a DCT on the blocks of data.

9. A processor for performing a cosine transform on blocks of data, the processor comprising:

a first memory for storing the blocks of data and reading out the data in a first direction, the data being read out in vectors having 2n elements, where n is a positive integer;

an even sum generator that generates even sums from even elements of the vectors read out of the first memory;

an odd sum generator that generates odd sums from odd elements of the vectors read out of the first memory;

a first adder that adds together the even and odd sums; and a subtracter that subtracts the odd sums from the even sums, the operations of the first adder and subtracter being performed simultaneously;

wherein the even sum generator includes a first control for generating terms from the even elements of the vectors read out of the first memory, and a second adder for summing the terms generated by the first control;

wherein the odd sum generator includes a second control for generating terms from the odd elements of the vectors read out of the first memory, and a third adder for summing the terms generated by the second control, whereby the first and second data controls generate terms for n different pairs of odd and even sums;

wherein the odd sum generator further includes a means for selectively multiplying the odd sums generated by the third adder with a constant value;

wherein the means for selectively multiplying includes:

a multiplier for multiplying an output of the odd sum generator with the constant value; and a multiplexer having a first input coupled to an output of the odd sum generator and a second input coupled to an output of the multiplier, the first input being selected when it is not desired to multiply the odd sum by the constant value, the second input being selected when it is desired to multiply the odd sum by the constant value.

10. The processor of claim 9, wherein the multiplier includes a plurality of shifters and a Wallace tree adder for adding together outputs of the shifters.

11. The processor of claim 9, wherein the second and third adders are Wallace tree adders.

12. The processor of claim 9, wherein the first data control performs selective shifting on the even elements, and the second adder adds selectively shifted terms together to generate first sums; and wherein the second data control performs selective shifting on the odd elements, and the third adder adds selectively shifted terms together to generate second sums.

13. The processor of claim 12, wherein the first and second generators generate a pair of transformed elements at any given time, wherein the first control generates each term for all n even sums and then selects the terms of the even sum for the pair of transformed elements being generated, and wherein the second control generates each terms for all n odd sums and then selects the terms of the odd sum for the pair of transformed elements being generated.

14. The processor of claim 9, wherein the first memory includes a Zig-Zag RAM.

15. The processor of claim 9, further comprising a means for scaling the results of the even and odd sum generators, whereby the processor performs a DCT on the blocks of data.

16. The processor of claim 9, further comprising means for scaling the blocks of data prior to storage in the first memory, whereby the processor performs an IDCT on the blocks of data.

* * * * *